(12) United States Patent
Suzuki et al.

(10) Patent No.: US 7,055,490 B2
(45) Date of Patent: Jun. 6, 2006

(54) IN-CYLINDER INJECTION, SPARK IGNITED INTERNAL COMBUSTION ENGINE

(75) Inventors: Hisao Suzuki, Numazu (JP); Masato Kawauchi, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/142,304

(22) Filed: Jun. 2, 2005

(65) Prior Publication Data

US 2005/0274351 A1 Dec. 15, 2005

(30) Foreign Application Priority Data

Jun. 11, 2004 (JP) .............................. 2004-174039

(51) Int. Cl.
*F02F 3/26* (2006.01)
*B23P 15/10* (2006.01)
*F16J 1/00* (2006.01)

(52) U.S. Cl. ........................................ 123/276; 123/307
(58) Field of Classification Search ................. 123/269, 123/276, 279, 285, 295, 301, 307
See application file for complete search history.

(56) References Cited

U.S. PATENT DOCUMENTS

| | | | |
|---|---|---|---|
| 4,920,937 A | | 5/1990 | Sasaki et al. |
| 5,327,864 A | | 7/1994 | Regueiro |
| 5,529,038 A | | 6/1996 | Tsuchida |
| 5,553,588 A | * | 9/1996 | Gono et al. ................. 123/276 |
| 5,775,288 A | | 7/1998 | Suzuki et al. |
| 5,908,018 A | * | 6/1999 | Suzuki ........................ 123/301 |
| 6,035,822 A | * | 3/2000 | Suzuki et al. ................ 123/276 |
| 6,035,823 A | * | 3/2000 | Koike et al. ................. 123/276 |
| 6,067,954 A | * | 5/2000 | Kudou et al. ................ 123/299 |
| 6,070,566 A | | 6/2000 | Lee |
| 6,186,113 B1 | * | 2/2001 | Hattori et al. ............... 123/298 |
| 6,263,855 B1 | * | 7/2001 | Kobayashi et al. .......... 123/295 |
| 6,286,477 B1 | * | 9/2001 | Yang et al. .................. 123/276 |
| 6,311,665 B1 | * | 11/2001 | Yasuoka et al. ............. 123/260 |
| 6,341,591 B1 | * | 1/2002 | Tsutsumi et al. ............ 123/295 |
| 6,378,490 B1 | | 4/2002 | Ottowitz et al. |
| 6,460,509 B1 | * | 10/2002 | Muramatsu et al. ......... 123/305 |
| 6,478,007 B1 | * | 11/2002 | Miyashita et al. ........... 123/295 |
| 6,672,276 B1 | * | 1/2004 | Hiraya et al. ................ 123/276 |

(Continued)

FOREIGN PATENT DOCUMENTS

DE 198 38 868 A1 2/1999

(Continued)

*Primary Examiner*—Hai Huynh
(74) *Attorney, Agent, or Firm*—Oliff & Berridge, PLC

(57) ABSTRACT

An in-cylinder injection, spark ignited internal combustion engine including a fuel injection valve spraying fuel substantially in a sector having a relatively small thickness and spreading substantially vertically to implement homogenous combustion and stratified combustion, ensures that for stratified combustion a large portion of the sprayed fuel is injected into a cavity and thus sufficiently vaporized and positioned as a combustible air fuel mixture in a vicinity of an ignition plug. A fuel injection valve is arranged at a perimeter of an upper portion of the cylinder and a piston has a top surface provided with a cavity biased in location to be farther from the fluid injection valve and having a wall opposite the fuel injection valve deviating toward the cylinder's substantial center the fuel sprayed for stratified combustion through the fuel injection valve into the cavity.

7 Claims, 4 Drawing Sheets

U.S. PATENT DOCUMENTS

| | | | |
|---|---|---|---|
| 6,705,281 B1 * | 3/2004 | Okamura et al. | 123/306 |
| 6,715,463 B1 * | 4/2004 | Kudo et al. | 123/261 |
| 6,725,827 B1 * | 4/2004 | Ueda et al. | 123/295 |
| 6,832,594 B1 * | 12/2004 | Hiraya et al. | 123/305 |
| 6,935,302 B1 * | 8/2005 | Kashiwagura et al. | 123/295 |
| 2004/0007202 A1 * | 1/2004 | Baika et al. | 123/276 |
| 2005/0155344 A1 * | 7/2005 | Kobayashi | 60/286 |

FOREIGN PATENT DOCUMENTS

| | | |
|---|---|---|
| DE | 198 53 357 A1 | 5/2000 |
| EP | 1 111 216 A2 | 6/2001 |
| EP | 1 275 831 A1 | 1/2003 |
| FR | 2 771 138 A1 | 5/1999 |
| JP | A 2000-220460 | 8/2000 |

* cited by examiner

IN-CYLINDER INJECTION, SPARK IGNITED INTERNAL COMBUSTION ENGINE

This nonprovisional application is based on Japanese Patent Application No. 2004-174039 filed with the Japan Patent Office on Jun. 11, 2004, the entire contents of which are hereby incorporated by reference.

BACKGROUND OF THE INVENTION

1. Field of the Invention

The present invention relates to in-cylinder injection, spark ignited internal combustion engine.

2. Description of the Background Art

When fuel is injected directly into a cylinder, an intake pipe does can have its wall surface unexposed to the fuel. This can ensure that an amount of fuel as required is supplied into the cylinder. For such an in-cylinder injection, spark ignited internal combustion engine, it has been proposed to spray fuel through a fuel injection valve into the cylinder in the form of a sector having a relatively small thickness and spreading vertically (see for example Japanese Patent Laying-Open No. 2000-220460).

If fuel is sprayed in such a vertically spreading sector in an intake process, the fuel readily disperses throughout the cylinder. Furthermore, fuel sprayed in such a sector has larger force of penetration than that sprayed in the form of a cone, and as it travels through the cylinder the fuel sprayed in the sector causes a large force of friction with intake air. The fuel thus tends to become fine particles and thus evaporate. A sufficiently homogenous air fuel mixture can thus be provided in the cylinder before ignition and satisfactorily homogenous combustion can thus be achieved.

An in-cylinder injection, spark ignited internal combustion engine can be required to provide not only homogenous combustion but also stratified combustion. For stratified combustion it has been proposed to spray fuel in the form of a vertically spreading sector in a compression process and utilize a vertical swirl to provide a combustible air fuel mixture directly in the vicinity of an ignition plug (see Japanese Patent Laying-Open No. 2000-22460 for example).

In stratified combustion, however, between fuel injection and ignition there is only a short period of time. As such, the fuel injected to provide the combustible air fuel mixture directly in the vicinity of the ignition plug, insufficiently evaporates. Furthermore, it is difficult to utilize the vertical swirl to ensure that the combustible air fuel mixture is positioned in the vicinity of the ignition plug.

This disadvantage associated with stratified combustion can be addressed by guiding the injected fuel to the vicinity of the ignition plug by utilizing a cavity formed at a top surface of a piston. This allows the injected fuel to receive heat from the cavity and thus sufficiently evaporate, and thus ensures that the combustible air fuel mixture is positioned in the vicinity of the ignition plug.

Typical cavity formed in a piston's top surface for stratified combustion can, however, hardly receive all of the fuel sprayed in the vertically spreading sector, and a relatively large amount of the fuel is sprayed outside the cavity and discharged as unburnt fuel resulting in poor exhaust emission.

SUMMARY OF THE INVENTION

The present invention contemplates an in-cylinder injection, spark ignited internal combustion engine including a fuel injection valve spraying fuel substantially in the form of a sector having a relatively small thickness and spreading substantially vertically to provide homogenous combustion and stratified combustion, that in the stratified combustion allows a major portion of the sprayed fuel to be injected into a cavity to ensure that the fuel is sufficiently evaporated and positioned as an air fuel mixture in the vicinity of an ignition plug.

The present invention provides an in-cylinder injection, spark ignited internal combustion engine including an ignition plug arranged substantially at a center of an upper portion of a cylinder, a fuel injection valve injecting fuel into the cylinder substantially in a sector having a relatively small thickness and spreading substantially in a vertical direction, and a piston, and switching between homogenous combustion by the fuel injected in an intake process and stratified combustion by the fuel injected in a compression process, the fuel injection valve being located at a perimeter of the upper portion of the cylinder, the piston having a top surface with a cavity biased in location to be farther from the fuel injection valve, the cavity having a wall opposite the fuel injection valve deviating toward the cylinder's substantial center the fuel sprayed and thus injected for the stratified combustion through the fuel injection valve into the cavity.

Preferably the cavity has a fuel groove connected thereto and extending in the piston's top surface toward the fuel injection valve along a projection of the fuel sprayed.

Still preferably the fuel sprayed impinges on the cavity at a sidewall adjacent to the wall opposite the fuel injection valve at an acute angle as seen in a plan view to thereafter proceed along the sidewall toward the wall opposite the fuel injection valve.

Still preferably the cavity's side wall adjacent to the wall opposite the fuel injection valve is inclined to form an obtuse angle with the cavity's bottom wall and the fuel sprayed impinging on the sidewall is provided with a component in speed in the cavity's radically inward direction.

Still preferably fuel deviated by the wall opposite the fuel injection valve toward the cylinder' substantial center moves on the cavity at a bottom wall partially inclined from the wall opposite the fuel injection valve toward the cylinder's center upward.

Still preferably the fuel sprayed impinges on the cavity at a bottom wall partially inclined from the cylinder's center toward the wall opposite the fuel injection valve upward.

Still preferably the piston's top surface has a deviation groove deviating the fuel sprayed in another substantial sector having a relatively small thickness and extending substantially in a vertical direction to allow the fuel sprayed in the other sector to arrive at the cylinder's substantial center faster than the fuel also sprayed through the fuel injection valve into the cavity and arriving at the cylinder's substantial center.

In the present invention provides an in-cylinder injection, spark ignited internal combustion engine a piston has a top surface provided with a cavity biased in location to be farther from a fuel injection valve so that in a compression process for stratified combustion the fuel injection valve can inject into the cavity a major portion of the fuel sprayed substantially in a sector having a relatively small thickness and spreading substantially vertically. Thus the fuel sprayed and thus injected into the cavity becomes small particles as it travels, and in addition it can receive heat from the cavity and thus satisfactorily vaporize, and is deviated by the cavity's wall opposite the fuel injection valve toward the cylinder's substantial center to ensure that a combustible air fuel mixture is positioned in the vicinity of the ignition plug arranged substantially at the center of the upper portion of the cylinder. This can prevent a relatively large amount of fuel from being injected outside the cavity and discharged as unburnt fuel.

In the present in-cylinder injection, spark ignited internal combustion engine preferably the cavity can have a fuel groove connected thereto, formed in the piston's top surface to extend toward the fuel injection valve along a projection of the sprayed fuel to ensure that the fuel injection valve can inject into the cavity the fuel sprayed substantially in a sector having a relatively small thickness and substantially vertically spreading rather widely.

In the present in-cylinder injection, spark ignited internal combustion engine preferably the fuel sprayed impinges on the cavity at a sidewall adjacent to the wall opposite the fuel injection valve at an acute angle as seen in a plan view to thereafter proceed along the sidewall toward the wall opposite the fuel injection valve. This ensures that the fuel sprayed and thus injected into the cavity moves toward the wall opposite the fuel injection valve and is thus deviated by the wall toward the cylinder's substantial center to further ensure that a combustible air fuel mixture is positioned in a vicinity of the ignition plug arranged substantially at the center of the upper portion of the cylinder.

In the present in-cylinder injection, spark ignited internal combustion engine preferably the cavity's side wall adjacent to the wall opposite the fuel injection valve is inclined to form an obtuse angle with the cavity's bottom wall and the fuel sprayed impinging on the sidewall is provided with a component in speed in the cavity's radically inward direction and thus hardly flows out from the sidewall toward the cavity's radially outward direction so that the fuel sprayed into the cavity can substantially entirely be a combustible air fuel mixture.

In the present in-cylinder injection, spark ignited internal combustion engine preferably fuel deviated by the wall opposite the fuel injection valve toward the cylinder's substantial center moves on the cavity at a bottom wall partially inclined from the wall opposite the fuel injection valve toward the cylinder's center upward. This allows the fuel to ascend along the inclination. This can help to guide the fuel to a vicinity of the ignition plug arranged substantially at the center of the upper portion of the cylinder to further ensure that a combustible air fuel mixture is positioned in the vicinity of the ignition plug.

In the present in-cylinder injection, spark ignited internal combustion engine preferably the fuel sprayed impinges on the cavity at a bottom wall partially inclined from the cylinder's center toward the wall opposite the fuel injection valve upward. The sprayed fuel having impinged on the bottom wall loses relatively large inertial force and when it is deviated by the wall opposite the fuel injection valve it hardly proceeds over the wall and flows outside the cavity so that the fuel sprayed into the cavity can substantially entirely be a combustible air fuel mixture.

In the present in-cylinder injection, spark ignited internal combustion engine preferably the piston's top surface has a deviation groove deviating the fuel sprayed in another substantial sector having a relatively small thickness and extending substantially in a vertical direction to allow the fuel sprayed in the other sector to arrive at the cylinder's substantial center faster than the fuel also sprayed through the fuel injection valve into the cavity and arriving at the cylinder's substantial center. Thus, at the time of ignition, the other spraying of the fuel moving through the deviation groove and thus arriving faster at the cylinder's substantial center disperses around the ignition plug relatively widely, whereas the spraying of the fuel moving on the cavity and thus arriving later at the cylinder's substantial center will not significantly disperse as seen from the ignition plug. Thus in the vicinity of the ignition plug a combustible air fuel mixture can be created and around this combustible air fuel mixture a lean air fuel mixture created to ensure propagation of flame in the cylinder around the ignition plug for stratified combustion.

The foregoing and other objects, features, aspects and advantages of the present invention will become more apparent from the following detailed description of the present invention when taken in conjunction with the accompanying drawings.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
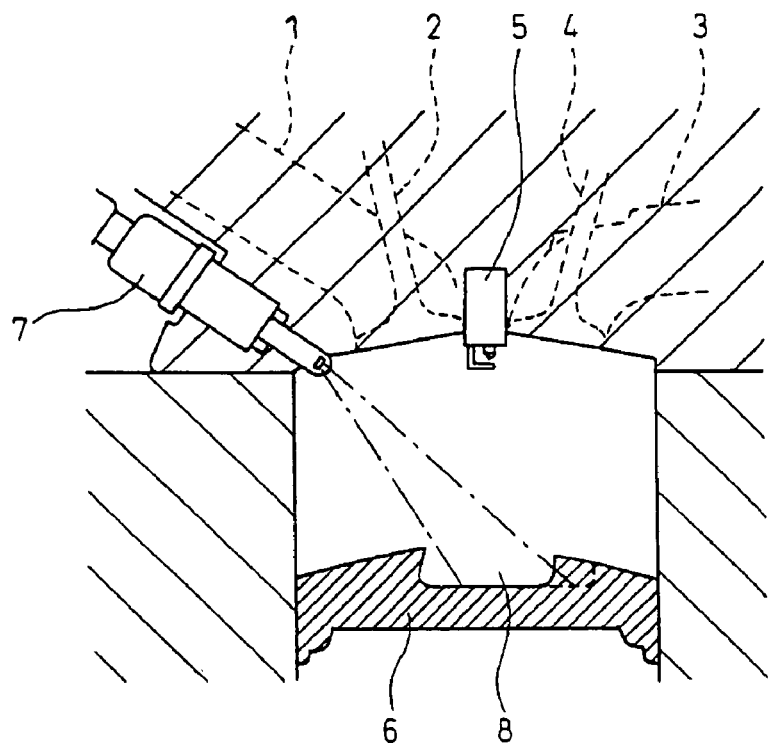
FIG. 1 is a schematic vertical cross section showing a first embodiment of the present in-cylinder injection, spark ignited internal combustion engine.
Figure 2:
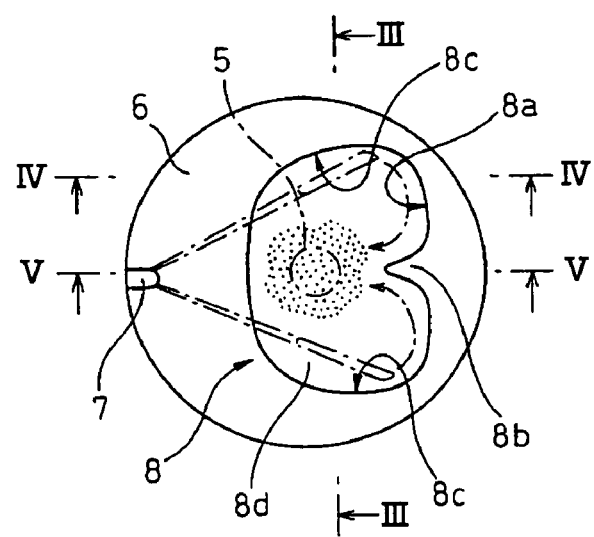
FIG. 2 is a plan view schematically showing an interior of the cylinder shown in FIG. 1.

FIG. 1 is a schematic vertical cross section showing a first embodiment of the present in-cylinder injection, spark ignited internal combustion engine and FIG. 2 is a plan view schematically showing an interior of the cylinder shown in FIG. 1. In these figures, the internal combustion engine includes a pair of intake air paths 1 communicating with a cylinder via an intake valve 2, and a pair of exhaust paths 3 communicating with the cylinder via an exhaust valve 4.

The internal combustion engine includes an ignition plug 5 arranged substantially at a center of an upper portion of the cylinder, and a piston 6. The internal combustion engine also includes a fuel injection valve 7 arranged at a perimeter of the upper portion of the cylinder closer to intake air path 1 and injecting fuel directly into the cylinder.

The present in-cylinder injection, spark ignited internal combustion engine allows fuel injection valve 7 to inject fuel into the cylinder in an intake process to create a homogenous air fuel mixture in the cylinder before a compression process's final stage, or ignition time, to achieve homogenous combustion. To provide a sufficiently satisfactorily homogenous air fuel mixture, preferably the injected fuel is dispersed in the cylinder widely. To do so, in the present embodiment, fuel injection valve 7 is adapted to inject the fuel substantially in the form of a sector having a relatively small thickness and substantially vertically spreading widely. Herein, "substantially vertically spreading" means spreading while traveling in a plane substantially parallel to a line of an axis of the cylinder. As shown in FIG. 2, fuel injection valve 7 is adapted to spray the fuel substantially in the form of the sector in two directions.

The fuel sprayed substantially in the form of the sector has larger force of penetration than that sprayed in the form of a cone, and as it travels through the cylinder the fuel sprayed in the sector causes friction with intake air in the cylinder. The fuel thus becomes fine particles and thus readily evaporates. Thus spraying the fuel in a substantially vertically spreading sector can help the fuel to evaporate and disperse throughout the cylinder so that a sufficiently homogenous air fuel mixture can be provided and satisfactorily homogenous combustion can be achieved.

When an engine starts, a catalyst device arranged in an engine's exhaust system must be warmed as soon as possible so that the catalyst device can start to purify exhaust gas. To do so, desirably a significant spark retard is introduced for example in or later than an intermediate stage of an expansion process to significantly increase the exhaust gas's temperature.

For homogenous air fuel mixture, however, if such a significant spark retard is introduced, misfire occurs. Accordingly in the present embodiment from starting to start the engine or immediately after the the engine starts until the catalyst device is completely warmed, stratified combustion is effected. Stratified combustion is performed by injecting fuel in a compression process at the later half stage to concentrate the fuel in a vicinity of ignition plug 5 to create a combustible air fuel mixture. This combustible air fuel mixture can reliably be ignited and combusted if the significant spark retard is introduced.

For the stratified combustion, there is a relatively short period of time between the injection of the fuel and the ignition. To ensure that the injected fuel evaporates before the ignition, the fuel is preferably sprayed into a cavity formed in a top surface of the piston receive heat from the cavity in addition to becoming fine particles as it travels. In the present embodiment piston 6 has a top surface provided with a cavity 8 therefor. A typical in-cylinder injection, spark ignited internal combustion engine has a cavity in the piston's top surface closer to a fuel injection valve and thus biased in location. If fuel is sprayed into a cylinder substantially in the form of a substantially vertically spreading sector as provided in the present embodiment, however, a large amount of the fuel would be injected outside the cavity.

The fuel sprayed outside the cavity will not be guided by the cavity toward the ignition plug. Thus the fuel will not be combusted and instead be discharged as unburnt fuel resulting in poor exhaust emission. Furthermore, to compensate therefor, the fuel must be injected in an accordingly increased amount also resulting in impaired fuel consumption rate in stratified combustion. In the present embodiment to allow injected fuel to be substantially entirely received by cavity 8 cavity 8 is formed in the piston's top surface at a location farther from the fuel injection valve, as shown in FIGS. 1 and 2. This ensures that fuel sprayed substantially in a substantially vertically spreading sector is received by cavity 8.

If the fuel sprayed into cavity 8 is not concentrated in a vicinity of ignition plug 5 arranged substantially at the center of the upper portion of the cylinder, however, stratified combustion cannot be achieved. In the present embodiment cavity 8 has a wall 8a opposite the fuel injection valve that has a protrusion 8b protruding substantially toward the cylinder's center. Thus the fuel sprayed into the cavity receives heat from the cavity and thus satisfactorily evaporates and, as indicated in FIG. 2 by a chained arrow, it is deviated along wall 8a by protrusion 8b substantially toward the cylinder's center so that a combustible air fuel mixture can be created under the ignition plug arranged substantially at the center of the upper portion of the cylinder, as indicated by dots. This combustible air fuel mixture, at the compression top dead center, is located in a vicinity of the ignition plug, and in the subsequent expansion process will also not be significantly dispersed from the vicinity of the ignition plug. As such, if a significant spark retard is introduced, the combustible air fuel mixture can still reliably be ignited and combusted.

Figure 3:
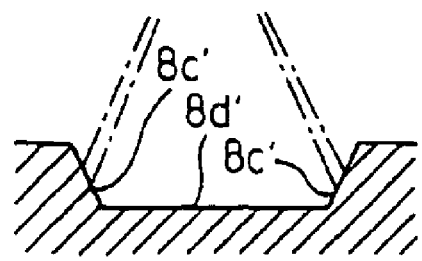
FIG. 3 is a cross section showing an exemplary variation of the cavity corresponding to a cross section III—III of FIG. 2.

FIG. 3 shows an exemplary variation of the cavity in a cross section taken along a line III—III of FIG. 2. In the first embodiment shown in FIG. 2, fuel sprayed into cavity 8 impinges on the cavity's bottom wall 8d and thereafter proceeds along the cavity's sidewall 8c and wall 8a opposite the fuel injection valve and moves to arrive at protrusion 8b. In the present exemplary variation, in contrast, the cavity has a sidewall 8c' adjacent to the wall opposite the fuel injection valve that is inclined to form an obtuse angle with the cavity's bottom wall 8d'. The fuel sprayed into the cavity impinges on sidewall 8c' and thereafter, similarly as has been described in the first embodiment, proceeds along sidewall 8c' and the wall opposite the fuel injection valve and is deviated by a protrusion toward the cylinder's center. The sprayed fuel having impinged on sidewall 8c' is provided with a component in speed in the cavity's radially inward direction and thus hardly flows out from sidewall 8c' toward the cavity's radially outward direction so that the fuel sprayed into the cavity can substantially entirely be a combustible air fuel mixture.

Figure 4:
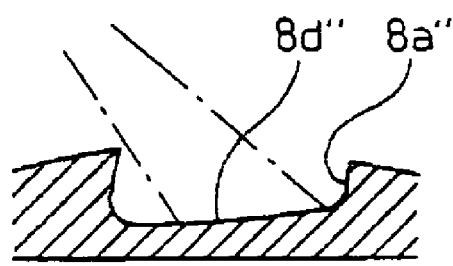
FIG. 4 is a cross section showing another exemplary variation of the cavity corresponding to a cross section IV—IV of FIG. 2.

FIG. 4 shows another exemplary variation of the cavity as seen in cross section taken along a line IV—IV of FIG. 2. In the present exemplary variation, sprayed fuel also impinges on the cavity's bottom wall and thereafter proceeds along a sidewall and a wall opposite the fuel injection valve. In the present exemplary variation, the sprayed fuel impinges on a bottom wall 8d" partially or entirely inclined from the cylinder's center upward toward a wall 8a" opposite the fuel injection valve. The sprayed fuel having impinged on bottom wall 8d" loses relatively large inertial force and when it is deviated by wall 8a" it hardly proceeds over wall 8a" and flows outside the cavity so that the fuel sprayed onto the cavity can substantially entirely be a combustible air fuel mixture.

Figure 5:
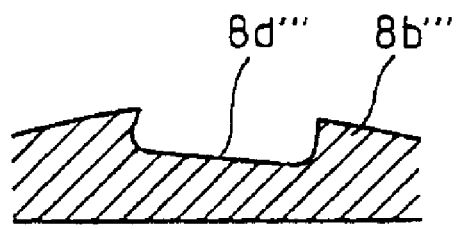
FIG. 5 is a cross section showing still another exemplary variation of the cavity corresponding to a cross section V—V of FIG. 2.

FIG. 5 shows still another exemplary variation of the cavity as seen in cross section taken along a line V—V of FIG. 2. In the present exemplary variation, sprayed fuel also impinges on the cavity's bottom wall an thereafter proceeds along a sidewall and a wall opposite the fuel injection valve, and is finally deviated by a protrusion toward the cylinder's center. In the present exemplary variation, the fuel deviated by a protruding 8b''' of the wall opposite the fuel injection valve toward the cylinder's center passes on the cavity's bottom wall 8d''' partially or entirely inclined from a wall 8a''' opposite the fuel injection valve upward toward the cylinder's center. This allows the fuel to ascend along the inclination. This can help to guide the fuel to a vicinity of the ignition plug arranged substantially at the center of the upper portion of the cylinder to further ensure that a combustible air fuel mixture is positioned in the vicinity of the ignition plug.

Figure 6:
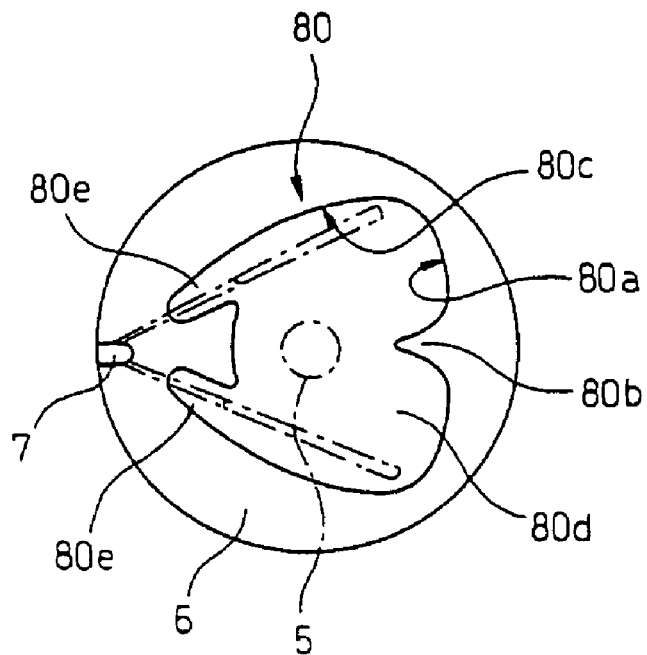
FIGS. 6–8 are plan views schematically showing interiors of cylinders in second to fourth embodiments, respectively, of the present in-cylinder injection, spark ignited internal combustion engine, corresponding to FIG. 2.

FIG. 6 is a plan view showing a second embodiment of the present in-cylinder injection, spark ignited internal combustion engine, corresponding to FIG. 2. In the present embodiment a cavity 80 has a fuel groove 80e connected thereto and extending in the piston's top surface toward the fuel injection valve along a projection of sprayed fuel. If fuel injection valve 7 sprays fuel in the form of a sector having a relatively small thickness and vertically further spreading (or having a large central angle), the sprayed fuel can entirely be received by the cavity. As well as in the first embodiment, the fuel sprayed into cavity 80 proceeds along a sidewall 80c and a wall 80a opposite the fuel injection valve, arrives at a protrusion 80d and is deviated thereby toward the cylinder's center to create a combustible air fuel mixture in cavity 80 under ignition plug 5. The fuel sprayed in such a widely spreading sector is further dispersible throughout the cylinder in injection in an intake process to allow further satisfactorily homogenous combustion. If fuel groove 80e as provided in the present embodiment is not formed and cavity 80 instead has its entirely extending in the piston's top surface toward the fuel injection valve, the cavity could still receive all of sprayed fuel. In such arrangement, however, the fuel deviated by protrusion 80d toward the cylinder's center would pass under ignition plug 5, and combustible air fuel mixture cannot be positioned in the vicinity of ignition plug.

Figure 7:
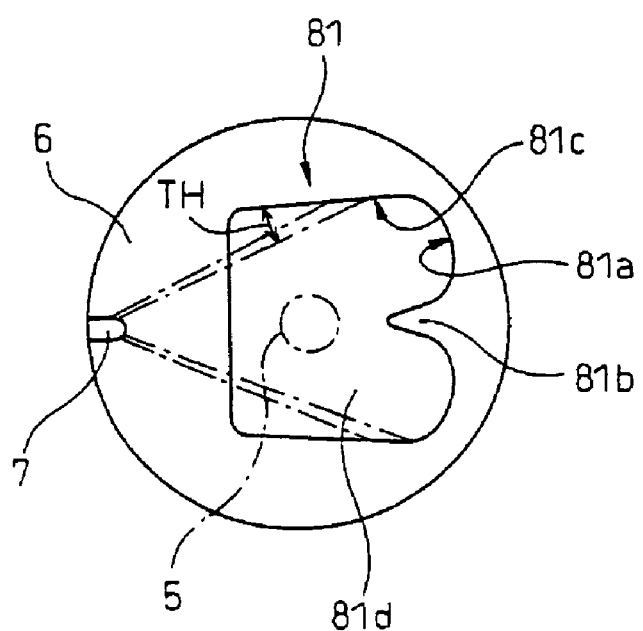

FIG. 7 is a plan view showing a third embodiment of the present in-cylinder injection, spark ignited internal combustion engine, corresponding to FIG. 2. In the present embodiment, sprayed fuel impinges on a cavity 81 at a sidewall 81c and thereafter proceeds along sidewall 81c toward a wall 81a opposite the fuel injection valve. When the fuel impinges on the sidewall, the fuel must be prevented from significantly losing its inertial force and thus failing to move by its inertial force via a protrusion 81b to under ignition plug 5. To do so, sidewall 81 is formed to allow sprayed fuel to impinges at an acute angle TH as seen in a plan view. This ensures that a combustible air fuel mixture is positioned in a vicinity of the ignition plug. Furthermore, the fuel impinging on sidewall 81c at acute angle TH will not have a portion moving along sidewall 81c in a direction opposite wall 81a opposite the fuel injection valve.

In the embodiments as have been described above, in homogeneous combustion, to also allow the cylinder to have fuel dispersed therein satisfactorily in a horizontal direction, fuel injection valve 7 sprays the fuel in two vertically spreading sectors substantially in symmetry with respect to a center vertical plane traversing the fuel injection valve's center axis and the ignition plug's center axis. Accordingly, the piston has a top surface provided with a cavity formed substantially in symmetry with respect to the center vertical plane to allow the two sprayings of the field to be joined together under ignition plug 5 to be a mass of combustible air fuel mixture. The two sprayings of the fuel, however, do not limit the present invention. For example, if only a single spraying of fuel is provided, the cavity may have the wall opposite the fuel injection valve without a protrusion and the fuel may only be moved in the cavity along one side wall, the wall opposite the fuel injection valve, and the other sidewall sequentially to under ignition plug 5.

Figure 8:
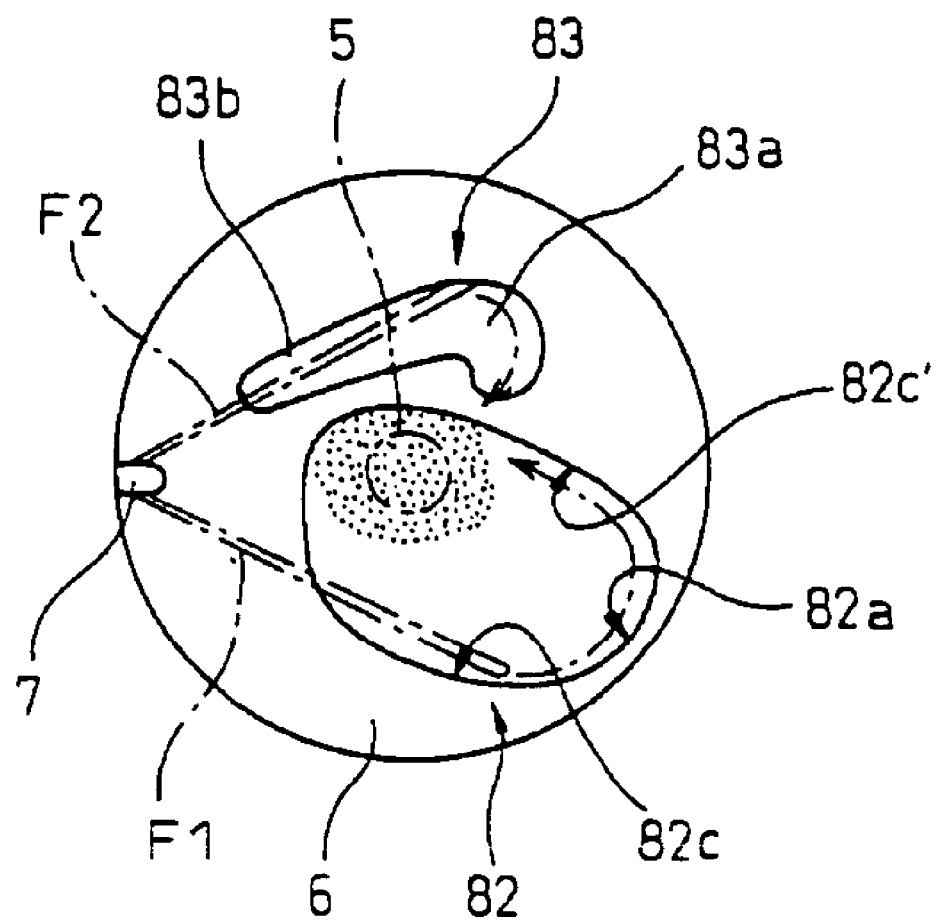

FIG. 8 is a plan view showing a fourth embodiment of the present in-cylinder injection, spark ignited internal combustion engine, corresponding to FIG. 2. In the present embodiment, fuel injection valve 7 sprays fuel substantially in a sector spreading in at least two, substantially vertical directions. One spraying of the fuel, as well as only a single spraying fuel as aforementioned, is directed to and received by a cavity 82 formed in the piston's top surface farther from the fuel injection valve and having one wall 82c, a wall 82a opposite the fuel injection valve and free of a protrusion, and the other sidewall 82c'.

One spraying F1 of the fuel thus injected moves, as indicated by a chained arrow, along the cavity's one sidewall 82c, wall 82a opposite the fuel injection valve, and the other sidewall 82c' sequentially to under ignition plug 5 and thus becomes a combustible air fuel mixture as indicated by dots. Furthermore, the other syringe F2 of the fuel is intended to arrive at the cylinder's substantial center faster than one spraying F1 of the fuel. To do so, the piston's top surface is provided with a deviation groove 83 having a portion 83b along a projection of the other spraying F2 of the fuel and a curved portion 83a deviating the sprayed fuel toward the cylinder's substantial center. It should be noted that curved portion 83a has a gradually reduced depth and the sprayed fuel having passed through curved portion 83a flows out on the piston's top surface.

While one spraying F1 of the fuel moves along the relatively large cavity 82 and thus arrives at the cylinder's substantial center, the other spraying F2 of the fuel moves along the relatively short deviation groove 83 and thus arrives at the cylinder's substantial center. As such, the other spraying F2 of the fuel arrives at the cylinder's substantial center faster than one spraying F1 of the fuel. As such, the other spraying F2 of the fuel at the time of ignition disperses around ignition plug 5 relatively widely. In contrast, one spraying F1 of the fuel at the time of ignition does not significantly disperse as seen from the ignition plug. Thus in the vicinity of the ignition plug a combustible air fuel mixture can be created and around this combustible air fuel mixture a lean air fuel mixture created to ensure propagation of flame in the cylinder around the ignition plug for stratified combustion.

It is possible to inject fuel in an intake process to create a lean air fuel mixture in the vicinity of the ignition plug around a combustible air fuel mixture. If lean air fuel mixture is created throughout the cylinder, however, the lean air fuel mixture in the vicinity of a cylinder bore decreases in temperature and thus hardly combusts, and consequently tends to be discharged as unburnt fuel. In the present embodiment, in contrast, a lean air fuel mixture can be created in the vicinity of the ignition plug only around a combustible air fuel mixture to reduce unburnt fuel otherwise discharged.

In all of the embodiments, fuel injection valve 7 is arranged at a perimeter of an upper portion of the cylinder closer to an intake valve, which is relatively low in temperature, to minimize fuel vapor generated in fuel injection valve 7. Accordingly, a side of the piston's top surface farther from the fuel injection valve will be a side closer to an exhaust valve. It is a matter of course, however, that if fuel injection valve 7 is arranged at a perimeter of the upper portion of the cylinder closer to the exhaust valve, that side of the piston's top surface farther from the fuel injection valve will be a side closer to the intake valve.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An in-cylinder injection, spark ignited internal combustion engine including an ignition plug arranged substantially at a center of an upper portion of a cylinder, a fuel injection valve injecting fuel into the cylinder substantially in a sector having a relatively small thickness and spreading substantially in a vertical direction, and a piston, and switching between homogenous combustion by the fuel injected in an intake process and stratified combustion by the fuel injected in a compression process, said fuel injection valve being located at a perimeter of the upper portion of the cylinder, said piston having a top surface with a cavity biased in location to be farther from the perimeter of the cylinder where said fuel injection valve is located than from the perimeter of the cylinder opposite said fuel injection valve, said cavity having a wall opposite said fuel injection valve deviating toward the cylinder's substantial center, the fuel sprayed and thus injected for said stratified combustion through said fuel injection valve into said cavity.

2. The in-cylinder injection, spark ignited internal combustion engine according to claim 1, wherein said cavity has a fuel groove connected thereto and extending in said piston's top surface toward said fuel injection valve along a projection of the fuel sprayed.

3. The in-cylinder injection, spark ignited internal combustion engine according to claim 1, wherein the fuel sprayed impinges on said cavity at a sidewall adjacent to said wall opposite said fuel injection valve at an acute angle as seen in a plan view to thereafter proceed along said sidewall toward said wall opposite said fuel injection valve.

4. The in-cylinder injection, spark ignited internal combustion engine according to claim 1, wherein said cavity's side wall adjacent to said wall opposite said fuel injection valve is inclined to form an obtuse angle with said cavity's bottom wall and the fuel sprayed impinging on said sidewall is provided with a component in speed in said cavity's radically inward direction.

5. The in-cylinder injection, spark ignited internal combustion engine according to claim 1, wherein fuel deviated by said wall opposite said fuel injection valve toward the cylinder's substantial center moves on said cavity at a bottom wall partially inclined from said wall opposite said fuel injection valve toward the cylinder's center upward.

6. The in-cylinder injection, spark ignited internal combustion engine according to claim 1, wherein the fuel sprayed impinges on said cavity at a bottom wall partially inclined from the cylinder's center toward said wall opposite said fuel injection valve upward.

7. The in-cylinder injection, spark ignited internal combustion engine according to claim 1, wherein said piston's top surface has a deviation groove deviating the fuel sprayed in another substantial sector having a relatively small thickness and extending substantially in a vertical direction to allow the fuel sprayed in said other sector to arrive at the cylinder's substantial center faster than the fuel also sprayed through said fuel injection valve into said cavity and arriving at the cylinder's substantial center.

* * * * *